UNITED STATES PATENT OFFICE.

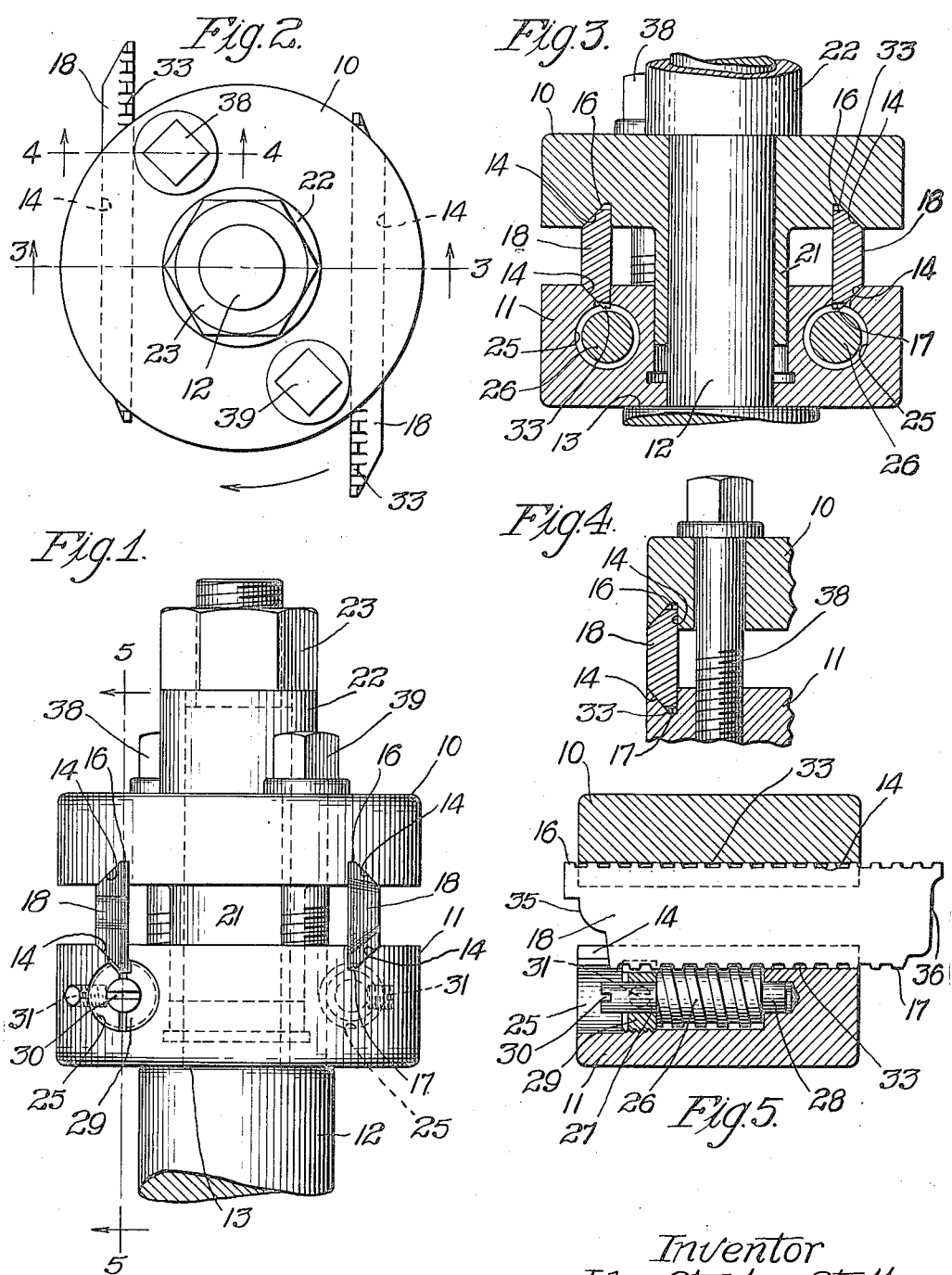

JOHN STANLEY STULL, OF CHICAGO, ILLINOIS, ASSIGNOR TO WESTERN ELECTRIC COMPANY, INCORPORATED, OF NEW YORK, N. Y., A CORPORATION OF NEW YORK.

CUTTER-HEAD.

1,380,686.　　　　　　　Specification of Letters Patent.　　Patented June 7, 1921.

Application filed May 8, 1919. Serial No. 295,626.

*To all whom it may concern:*

Be it known that I, JOHN STANLEY STULL, a citizen of the United States, residing at Chicago, in the county of Cook and State of Illinois, have invented certain new and useful Improvements in Cutter-Heads, of which the following is a full, clear, concise, and exact description.

This invention relates to cutter heads, and more particularly to a high speed rotary cutter head for operating on wood and similar soft materials and in which the cutter blades are mounted between holding members which are secured to the driving spindle by clamping means on the spindle.

The object of this invention in general is to provide a rotary cutter head which can be operated at a high speed and with a maximum of safety to the operator. It frequently occurs that an operator in mounting the present form of cutter head on the driving spindle will forget to tighten the clamp nut and thereby fail to securely clamp the cutter blades between the collars. When in this condition and the spindle is revolved, the cutter blades will be liable to be thrown out of the cutter head, due to the action of centrifugal force, and may cause injury to the operator or to others nearby.

In accordance with one feature of this invention locking members are provided which engage locking surfaces on the cutter blades independently of the clamping nut to keep the blades from being thrown out of the cutter head when the head is revolving.

The locking members for the cutter blades may also constitute a means for adjusting them.

Means are also provided independent of the clamping means on the spindle for securing the collars together, thereby permitting the head to be removed without disturbing the adjustment of the cutter knives.

In the drawings:
Figure 1 is a side elevational view of the cutter head mounted on the end of the driving spindle;

Fig. 2 is a top plan view thereof;

Fig. 3 is a vertical sectional view taken on the line 3—3 of Fig. 2;

Fig. 4 is a vertical fragmentary sectional view taken on the line 4—4 of Fig. 2, and Fig. 5 is a vertical sectional view taken on the line 5—5 of Fig. 1.

As shown in the drawings, 10 and 11 designate upper and lower collars which form the body of the cutter head and which are mounted on a vertical driving spindle 12. The lower collar 11 rests on a shoulder 13 formed on the spindle 12. The collars 10 and 11 are provided with triangular shaped slots 14 on their inside faces adapted to engage beveled edges 16 and 17 of cutter blades 18. An alining sleeve 21 surrounding the spindle 12 projects from the lower surface of the upper collar 10 into a suitable opening in the collar 11. A spacing sleeve 22 is mounted on top of the spindle 12. Screw threaded onto the spindle 12 above the spacing sleeve 22 is a clamping nut 23 which clamps the cutter head on the driving spindle against the shoulder 13 thereon.

Carried in openings 25, 25 in the lower collar 11 on opposite sides of the center thereof and directly below the slots 14 are screws or worms 26, 26. The screws 26, 26 are turned down at both ends to form bearings 27 and 28. Screw threaded into the openings 25, 25 and locking the screws 26, 26 in place in the openings 25, 25 are lock screws 29, 29. The lock screws 29, 29 also form supports for the bearings 27, 27 which extend therethrough and are slotted at the ends as indicated at 30 for the purpose of receiving a suitable tool. Set screws 31, 31 for holding the lock screws 29, 29 and the screws 26, 26 in a set position are threaded into the lower collar 11 through the lock screws 29, 29 and against the bearings 27, 27 of the screws 26, 26.

The beveled edges 16 and 17 of the cutter blades 18 are provided with notches 33, 33 on their edges adapted to be engaged by the threads on the screws 26, 26 for locking the cutter blades against longitudinal movement independently of the clamping nut 23. The cutter blades 18 are each equipped with two differently shaped cutting edges 35 and 36 upon opposite ends thereof which allow for two different cuts by the same pair of blades by reversing the blades. The beveled edges 16 and 17 are both provided with the notches 33, 33 to allow for the locking of the blades when either cutting edge is being used. The lock screws 29, 29 are slotted on their periphery in line with the notched edges of the blades to allow for the movement of the blades from one side to the other of the holder.

Passing loosely through the upper collar

10 and screw threaded into the lower collar 11 are screws 38 and 39 for clamping the blades between the collars independently of the clamping nut 23. This also allows the complete cutter head to be taken from the driving spindle as a unit, thereby retaining the adjustment of the blades which is a great advantage at times. The blades can also be accurately adjusted when the cutter head is not mounted on the driving spindle.

To remove or adjust the blades or to reverse them the clamping nut 23 and the screws 38 and 39 are unscrewed enough to allow for the lifting of the upper collar 10 and the disengaging of the notches 33, 33 on the blades from the threads on the screws 26, 26. The blades can also be adjusted by merely unloosening the clamping nut 23, the screws 38 and 39, and the set screws 31, 31, and then turning the screws 26, 26.

What is claimed is:

1. In a cutter head, a plurality of cutter knives each provided upon one edge with a locking surface, separable collar members, clamping means for securing said cutter knives between said collars, and combined locking and adjusting means associated therewith and removable therefrom adapted to coöperate with the locking surface on said cutter knives to control the adjustment thereof and to retain said cutter knives against longitudinal movement independently of the clamping means, said means adapted for removal from said clamping means without affecting the proper clamping of the knives thereby.

2. In a cutter head, a plurality of cutter knives each provided upon one edge with a locking surface, a pair of separable collar members, clamping means for securing said cutter knives between said collars, and combined locking and adjusting means mounted in one of said collar members and removable therefrom adapted to engage the locking surface on said cutter knives to control the adjustment thereof and to retain said cutter knives against longitudinal movement independently of the clamping means, said means adapted for removal from said clamping means without affecting the proper clamping of the knives thereby.

3. In a cutter head, a plurality of cutter knives each provided upon one edge with a plurality of notches, separable collar members, clamping means for securing said cutter knives between said collars, and screw threaded adjusting means mounted in one of said collars and engaging the notched edges of said cutter knives to control the adjustment thereof and to retain said cutter knives against longitudinal movement independently of the clamping means.

4. In a cutter head, a plurality of cutter knives each provided upon opposite ends with cutting edges and each provided upon opposite edges with a plurality of notches, a pair of separable collars, clamping means for securing said cutter knives between said collars, and screw threaded means adapted to coöperate with the notches in either edge of each of said cutter knives to retain them against longitudinal movement independently of said clamping means.

5. In a cutter head, a plurality of cutter knives each provided upon one edge with a plurality of notches, a pair of separable collars, clamping means for securing said cutter knives between said collars, a screw threaded member for each of said cutter knives carried by one of said collar members and adapted to engage the notches in the edges of said cutter knives to retain them against longitudinal movement, and clamping means for said screw threaded members.

In witness whereof, I hereunto subscribe my name this 15th day of April, A. D. 1919.

JOHN STANLEY STULL.